Oct. 31, 1967

A. A. ADAMS 3,349,496

CUTTING GAGE AND GUIDE

Filed Oct. 27, 1964

INVENTOR.
ARTHUR A. ADAMS
BY
Gardner + Zimmerman
ATTORNEYS

3,349,496
CUTTING GAGE AND GUIDE
Arthur A. Adams, 1764 Bayovista Ave., San Pablo, Calif. 94806
Filed Oct. 27, 1964, Ser. No. 406,760
1 Claim. (Cl. 33—143)

This invention relates to the cutting of spacer boards for perpendicular disposition between parallel spaced apart members, and is more particularly directed to a gage which is capable of being set to facilitate the right angular cutting of boards to lengths substantially precisely equal to the perpendicular distance between parallel spaced members with substantially any given rotary power saw.

It is frequently necessary to cut boards to fit perpendicularly between existing parallel spaced apart members such as building studs. This is typically accomplished, for example, by measuring the perpendicular distance between the parallel members and marking a right angular cut guide line on a board at this distance from a square cut end thereof. A rotary power saw is then employed to cut through the board along the guide line and thus provide a spacer for perpendicular disposition between the parallel members. The foregoing procedure is tedious and time consuming where a large number of spacers are to be cut inasmuch as it is necessary to precisely lay off the predetermined perpendicular distance and mark a cut guide line on a board for each spacer which is to be cut. In addition, the procedure is quite susceptible to the establishment of inconsistencies in the resulting lengths of the spacers by virtue of the human error attending the measurement required in connection with the marking of each guide line and the lack of a fixed guide for enabling the saw to accurately follow the guide line.

It is therefore an object of the present invention to provide a gage which facilitates the guiding of a rotary power saw in the duplicate cutting of spacer boards to substantially precisely the perpendicular distance between parallel spaced members.

Another object of the invention is the provision of a gage of the class described which may be initially set in accordance with characteristics of substantially any given rotary power saw and thereafter readily adjusted to the perpendicular distance between substantially any given pair of parallel spaced members to facilitate guided cutting of a board by the saw to a length substantially precisely equal to the perpendicular distance.

It is a further object of the invention to provide a gage of the class described which is of simple economical construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adapted within the scope of the invention as set forth in the claims.

Figure 1:
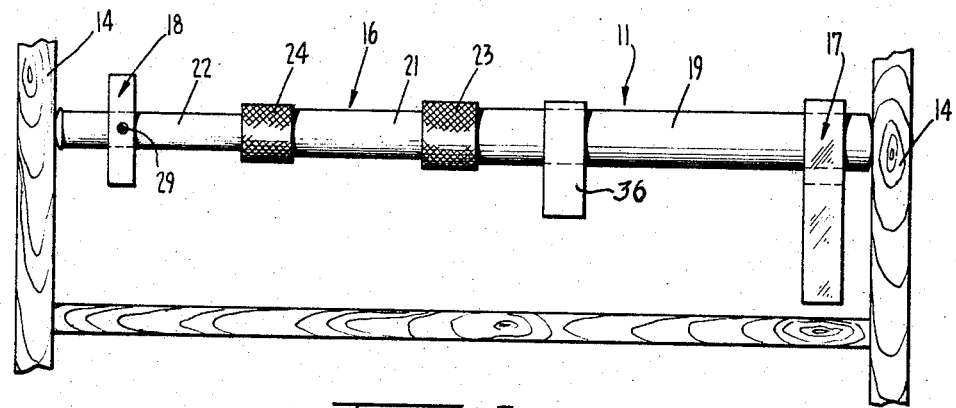
FIGURE 1 is an elevation view of a gage in accordance with the invention as adjustably positioned between parallel spaced members to set the gage to the perpendicular distance therebetween.
Figure 2:
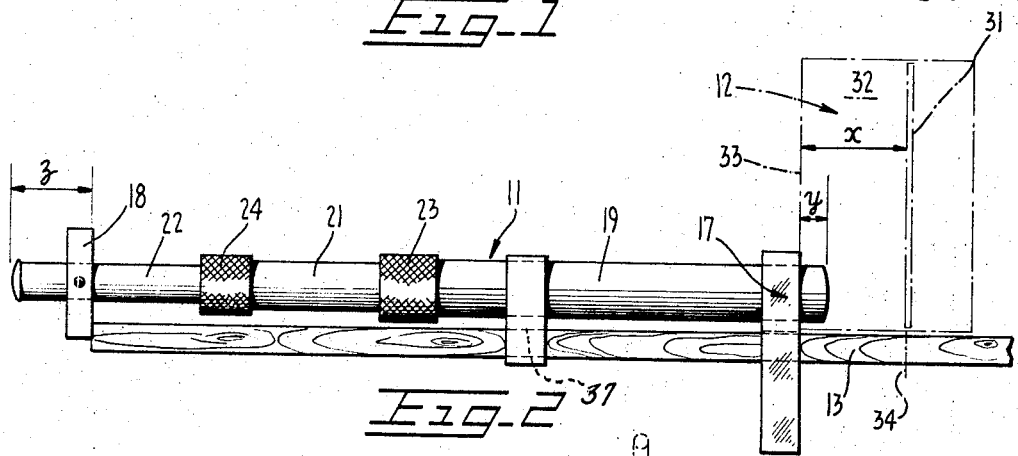
FIGURE 2 is a view of the gage similar to FIGURE 1, but with the gage operatively positioned with respect to a board and rotary power saw to guide the saw in the cutting of the board to a length substantially equal to the perpendicular distance between the parallel members of FIGURE 1.

Referring now to the drawing, FIGURES 1 and 2 in particular, there will be seen to be provided a gage 11 for facilitating guidance of a rotary power saw 12 to cut a board 13 to substantially the perpendicular distance between parallel spaced members 14 and thereby provide a spacer for perpendicular disposition therebetween. In basic respects the gage includes an adjustably expansible body 16 having a guide member 17 transversely secured adjacent one end, and a collar 18 coaxially mounted adjacent the other end for selective movement longitudinally of the body.

In the preferred form of the gage, the expansible body 16 comprises a plurality of telescoping members 19, 21, 22 of succesively decreasing cross section with rotary locking means 23, 24 of a conventional type provided at the joints between adjacent members. The locking means 23 serves to lock the members 19, 21 in any of their relative telescoping positions upon tightening rotation of the locking means, while the locking means 24 serves a similar function between the members 21, 22. Thus, the members may be telescopically adjusted and locked in position to provide different overall lengths of the body 16.

The guide member 17 is fixedly secured to the body member 19 transversely thereof at a position slightly inwardly spaced from its free end. The guide member preferably includes a substantially square portion 26 secured to the member 19 and an elongated rectangular portion 27 projecting right angularly from one side of portion 26. The upper side of portion 27 is coextensive with a side of portion 26 while the lower side of portion 27 is tangent to the body member 19. A rectangular notch 28 is thus defined by the right angularly intersecting lower side of portion 27 and adjacent side of portion 26.

The collar 18 is preferably circular and coaxially slidable along body member 22. Locking of the collar at any position longitudinally of the member 22 is facilitated as by means of a set screw 29 threaded radially through the collar. It will be appreciated that the side faces of collar 18 and guide member 17 are substantially precisely parallel.

In the use of the gage 11, it is first set in accordance with characteristics of the particular rotary power saw which is to be employed to cut the boards to the required lengths for perpendicular disposition between parallel spaced members. More particularly, in the case of the saw 12 it will be noted that the cutting blade 31 extends through a rectangular base plate 32 in right angular relation thereto. The side face of the blade is perpendicularly spaced from a parallel guide edge 33 of the base plate by a distance $x$ as indicated in FIGURE 2. This distance may vary for different saws, and is the characteristic that must be considered in the initial setting of the gage. The distance $x$ is ascertained as by accurately measuring same with the aid of vernier calipers, or the like. The fixed distance $y$ between the outer end face of the guide member 17 and free end of body member 19 is likewise accurately determined or already known. The collar 18 is now moved along body member 22 to a position wherein the inner end face of the collar is spaced from the free end of the member 22 by a distance $z$ which is equal to the difference between the distances $x$ and $y$, i.e., $z = x - y$. This positioning of the collar is accurately accomplished with the aid of vernier calipers or the like and the collar is then locked in position by means of set screw 29. The gauge 11 is thus set to the characteristics of the saw 12 and is ready for guided perpendicular distance cutting service.

Figure 3:
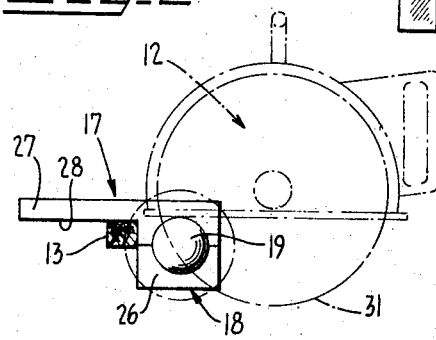
FIGURE 3 is an end view of the arrangement of FIGURE 2.

To cut spacers to fit perpendicularly between the parallel members 14, the gage 11 is placed between these members and the body members 19, 21, 22 are extended to engage the free ends of members 19, 22 therewith, as shown in FIGURE 1. The body members are locked in position by the locking means 23, 24 and the overall length of the body 16 is thus substantially equal to the perpendicular distance between the parallel members 14. The gage is then positioned with the inner end face of collar 18 engaging a square cut end of the board 13 and the right angular crotch of the notch 28 of guide member 17 engaging right-angularly intersecting sides of the board, as shown in FIGURES 2 and 3. The saw 12 is now positioned with the guide edge 33 of base plate 32 squarely abutting the outer end face of guide member 17 as the saw is moved toward the board and the rotary blade 31 cuts therethrough. The resulting cut line of the saw is indicated at 34 and will be observed to be spaced from the free end of the board by the distance between inner face of collar 18 and outer face of guide member 17 increased by the distance $x$ between the guide edge 33 of the saw base plate 32 and adjacent face of the saw blade 31. The distance between the inner and outer faces respectively of the collar and guide member is equal to the overall length of the body 16 (perpendicular distance between parallel members 14) less the sum of the distances $y$ and $z$. However, the sum of $y$ and $z$ is equal to $x$. Therefore, the length of the spacer cut from the board 13 is equal to the perpendicular distance between the parallel members 14. Additional spacers may be rapidly cut in a similar manner with the assistance of the gage 11.

Where relatively long perpendicular distances are involved, it is desirable to provide for added support of the gage on the board during cutting. Therefore, a support block 36 is advantageously fixed upon body member 19 adjacent the opposite end thereof from guide member 17 and this block is formed with a rectangular notch 37 defined by right angularly related edges aligned with the edges of notch 28 of the guide member. When the gage is operatively positioned on a board, both notches 28, 37 engage the board and hence provide a relatively sturdy two point support which is effective in maintaining the gage in fixed position on the board during guidance of the sew.

What is claimed is:

A gage comprising a plurality of telescoping members of successively decreasing cross section, rotary locking means disposed at the joints between adjacent ones of said telescoping members for selectively locking same in different relative telescoping positions, a substantially rectangular guide member fixedly secured to the telescoping member of largest cross section transversely thereof at a position spaced from its free end, said guide member having a rectangular board receiving notch, a collar slidably mounted coaxially upon the telescoping member of smallest cross section, a set screw carried by said collar for selectively locking same upon said telescoping member of smallest cross section, and a support block fixedly secured to said telescoping member of largest cross section in spaced relation to said guide member, said block having a rectangular board receiving notch with edges aligned with said notch of said guide member.

References Cited
UNITED STATES PATENTS

| | | | |
|---|---|---|---|
| 348,674 | 9/1886 | Humphrey | 33—161 X |
| 441,522 | 11/1890 | Watson | 33—194 |
| 648,576 | 5/1900 | Taylor | 33—161 |
| 3,242,580 | 3/1966 | Crawford | 33—174 |

SAMUEL S. MATTHEWS, *Primary Examiner.*

LEONARD FORMAN, *Examiner.*